(12) United States Patent
Lahaie et al.

(10) Patent No.: US 8,527,353 B2
(45) Date of Patent: Sep. 3, 2013

(54) METHOD AND APPARATUS FOR ADMINISTERING A BIDDING LANGUAGE FOR ONLINE ADVERTISING

(75) Inventors: Sebastien Lahaie, Rye, NY (US); David M. Pennock, Monroe Township, NJ (US); Sihem Amer-Yahia, New York, NY (US); David Parkes, Cambridge, MA (US)

(73) Assignee: Yahoo! Inc., Sunnyvale, CA (US)

( * ) Notice: Subject to any disclaimer, the term of this patent is extended or adjusted under 35 U.S.C. 154(b) by 930 days.

(21) Appl. No.: 12/211,399

(22) Filed: Sep. 16, 2008

(65) Prior Publication Data
US 2010/0070322 A1   Mar. 18, 2010

(51) Int. Cl.
*G06Q 30/00*   (2012.01)

(52) U.S. Cl.
USPC .............. 705/14.71; 705/14.4; 705/14.73

(58) Field of Classification Search
USPC ................................ 705/8, 14.4, 14.73
See application file for complete search history.

(56) References Cited

U.S. PATENT DOCUMENTS

| | | | |
|---|---|---|---|
| 5,615,325 A * | 3/1997 | Peden | 715/854 |
| 5,828,990 A * | 10/1998 | Nishino et al. | 704/2 |
| 5,878,423 A * | 3/1999 | Anderson et al. | 1/1 |
| 6,151,600 A * | 11/2000 | Dedrick | 1/1 |
| 6,571,279 B1 * | 5/2003 | Herz et al. | 709/217 |
| 6,842,894 B1 * | 1/2005 | Havemose | 717/148 |
| 7,181,438 B1 * | 2/2007 | Szabo | 1/1 |
| 7,415,423 B2 * | 8/2008 | Ranka et al. | 705/14.41 |
| 7,668,885 B2 * | 2/2010 | Wittke et al. | 707/705 |
| 7,801,896 B2 * | 9/2010 | Szabo | 707/739 |
| 7,822,620 B2 * | 10/2010 | Dixon et al. | 705/1.1 |
| 7,865,397 B2 * | 1/2011 | Makeev et al. | 705/14.71 |
| 2002/0026457 A1 * | 2/2002 | Jensen | 707/501.1 |
| 2004/0059705 A1 * | 3/2004 | Wittke et al. | 707/1 |
| 2005/0021441 A1 * | 1/2005 | Flake et al. | 705/37 |
| 2005/0021442 A1 * | 1/2005 | Flake et al. | 705/37 |
| 2005/0021461 A1 * | 1/2005 | Flake et al. | 705/40 |
| 2005/0129201 A1 * | 6/2005 | Palmer et al. | 379/114.01 |
| 2005/0171878 A1 * | 8/2005 | Pennock | 705/35 |
| 2006/0069749 A1 * | 3/2006 | Herz et al. | 709/219 |
| 2006/0112090 A1 * | 5/2006 | Amer-Yahia et al. | 707/4 |
| 2006/0190412 A1 * | 8/2006 | Ostroff | 705/65 |
| 2006/0224496 A1 * | 10/2006 | Sandholm et al. | 705/37 |
| 2007/0050204 A1 * | 3/2007 | Ranka et al. | 705/1 |
| 2007/0067297 A1 * | 3/2007 | Kublickis | 707/9 |
| 2007/0078849 A1 * | 4/2007 | Slothouber | 707/5 |
| 2007/0088605 A1 * | 4/2007 | Ghate et al. | 705/14 |
| 2007/0128899 A1 * | 6/2007 | Mayer | 439/152 |
| 2007/0156677 A1 * | 7/2007 | Szabo | 707/5 |

(Continued)

OTHER PUBLICATIONS

Tree traversal—Wikipedia; http://en.wikipedia.org/wiki/Tree_search_algorithm; accessed Mar. 7, 2011.*

*Primary Examiner* — John G Weiss
*Assistant Examiner* — Adam Chornesky
(74) *Attorney, Agent, or Firm* — Brinks Hofer Gilson & Lione

(57) ABSTRACT

A method and apparatus are provided for administering a bidding language for online advertising. In one example, the method includes providing an expressive bidding language that allows an advertiser to specify an ad campaign in a tree structure, receiving the ad campaign that is written in the expressive bidding language, translating the ad campaign into scripts, and using the scripts to access appropriate inventory from an ad inventory database.

18 Claims, 6 Drawing Sheets

(56) References Cited

U.S. PATENT DOCUMENTS

| | | | |
|---|---|---|---|
| 2007/0179856 A1* | 8/2007 | O'Kelley | 705/14 |
| 2007/0198350 A1* | 8/2007 | O'Kelley et al. | 705/14 |
| 2007/0214065 A1* | 9/2007 | Kahlon et al. | 705/28 |
| 2007/0226062 A1* | 9/2007 | Hughes et al. | 705/14 |
| 2008/0221983 A1* | 9/2008 | Ausiannik et al. | 705/14 |
| 2008/0255936 A1* | 10/2008 | Ghate | 705/14 |
| 2008/0281627 A1* | 11/2008 | Chang et al. | 705/1 |
| 2009/0077113 A1* | 3/2009 | Fidaali et al. | 707/102 |
| 2009/0083228 A1* | 3/2009 | Shatz et al. | 707/3 |
| 2009/0089789 A1* | 4/2009 | Faltings et al. | 718/104 |
| 2010/0070288 A1* | 3/2010 | Pandey et al. | 705/1 |
| 2010/0070322 A1* | 3/2010 | Lahaie et al. | 705/8 |
| 2010/0138271 A1* | 6/2010 | Henkin et al. | 705/10 |

* cited by examiner

METHOD AND APPARATUS FOR ADMINISTERING A BIDDING LANGUAGE FOR ONLINE ADVERTISING

FIELD OF THE INVENTION

The present invention relates to bidding for online ad space. More particularly, the present invention relates to bidding for online ad space using a bidding language.

BACKGROUND OF THE INVENTION

Electronic exchanges, including online auctions and guaranteed deliveries, have proliferated along with the Internet. These electronic exchanges aim to provide a high degree of trading efficiency by bringing together a large number of buyers and sellers. Such exchanges are focused on directly matching the bids and offers of buyers and sellers. Conventional transactions on the exchange are between (i) buyers and sellers, (ii) intermediaries (e.g., brokers, which may be a buyer or seller), or (iii) buyers or sellers and intermediaries.

The proliferation of Internet activity has also generated tremendous growth for advertising on the Internet. Typically, advertisers (i.e., buyers of ad space) and online publishers (sellers of ad space) have agreements with one or more advertising networks (ad networks), which provide for serving an advertiser's banner or ad across multiple publishers, and concomitantly provide for each publisher having access to a large number of advertisers. Ad networks (which may also manage payment and reporting) may also attempt to target certain Internet consumers (i.e., users) with particular advertisements to increase the likelihood that the consumer will take an action with respect to the ad. From an advertiser's perspective, effective targeting is important for achieving a high return on investment (ROI).

Online advertising markets exhibit undesirable inefficiencies when buyers and sellers are unable to transact. For instance, although a publisher may be subscribed to many ad networks, and one or more of those ad networks may transact inventory with other ad networks, only one of the ad networks to which the publisher is subscribed will be involved in selling (e.g., auctioning or guaranteeing delivery) a given ad space for the publisher. The publisher, or a gatekeeper used by the publisher, selects or prioritizes which ad network (or advertiser having a direct agreement with the publisher) will serve the impression for a given ad request.

Further, in online advertising, advertisers may wish to target broad consumer segments (e.g., California consumers) or specific consumer segments (e.g., males of ages 20-34 in California browsing finance pages). Advertisers need the ability to specify succinctly their values for and exposure (i.e., number of ad views) to various consumer segments, from broad to narrow.

Advertisers spend long hours specifying an ad campaign which, most of the time, ends up not being portable. Once an ad campaign is written down into a contract, a company such as Yahoo!® invests long hours translating the ad campaign into scripts which are used to access the inventory and allocate ads.

Driven by the shift from broadcast to interactive media, almost every aspect of advertising is being automated, including its sale, delivery, and measurement. Moving away from the real estate metaphor of buying space, advertisers may now buy very specific contextual events like "male user visits sports page on the weekend", or more generally bundles of contextual events. As a result, advertisers need more flexible and expressive ways to describe their ad campaign goals.

Within this document, one of ordinary skill recognizes certain abbreviations such as, for example, CPI (cost per impression), CPM (cost per 1000 impressions), CPC (cost per click), CPA (cost per acquisition), eCPM (effective CPM).

SUMMARY OF THE INVENTION

What is needed is an improved method having features for addressing the problems mentioned above and new features not yet discussed. Specifically, there is a need for a concise and expressive language to specify ad campaigns which can be interpreted automatically using ad pricing and ad allocation algorithms. Broadly speaking, the present invention fills these needs by providing a method and apparatus for administering a bidding language for online advertising. It should be appreciated that the present invention can be implemented in numerous ways, including as a method, a process, an apparatus, a system or a device. Inventive embodiments of the present invention are summarized below.

In one embodiment, a method is provided for administering a bidding language for online advertising. The method comprises providing an expressive bidding language that allows an advertiser to specify an ad campaign in a tree structure, receiving the ad campaign that is written in the expressive bidding language, translating the ad campaign into scripts, and using the scripts to access to appropriate inventory in an ad inventory database.

In another embodiment, an apparatus is provided for administering a bidding language for online advertising. The apparatus is configured for providing an expressive bidding language that allows an advertiser to specify an ad campaign in a tree structure, receiving the ad campaign that is written in the expressive bidding language, translating the ad campaign into scripts, and using the scripts to access appropriate inventory in an ad inventory database.

In still another embodiment, a computer readable medium carrying one or more instructions for administering a bidding language for online advertising is provided. The one or more instructions, when executed by one or more processors, cause the one or more processors to perform the steps of providing an expressive bidding language that allows an advertiser to specify an ad campaign in a tree structure, receiving the ad campaign that is written in the expressive bidding language, translating the ad campaign into scripts, and using the scripts to carry out an access to appropriate inventory from an ad inventory database.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention for administering a bidding language for online advertising is provided. Numerous specific details are set forth in order to provide a thorough understanding of the present invention. It will be understood, however, to one skilled in the art, that the present invention may be practiced with other specific details.

Overview of Ad Delivery in an Exchange

Figure 1A:
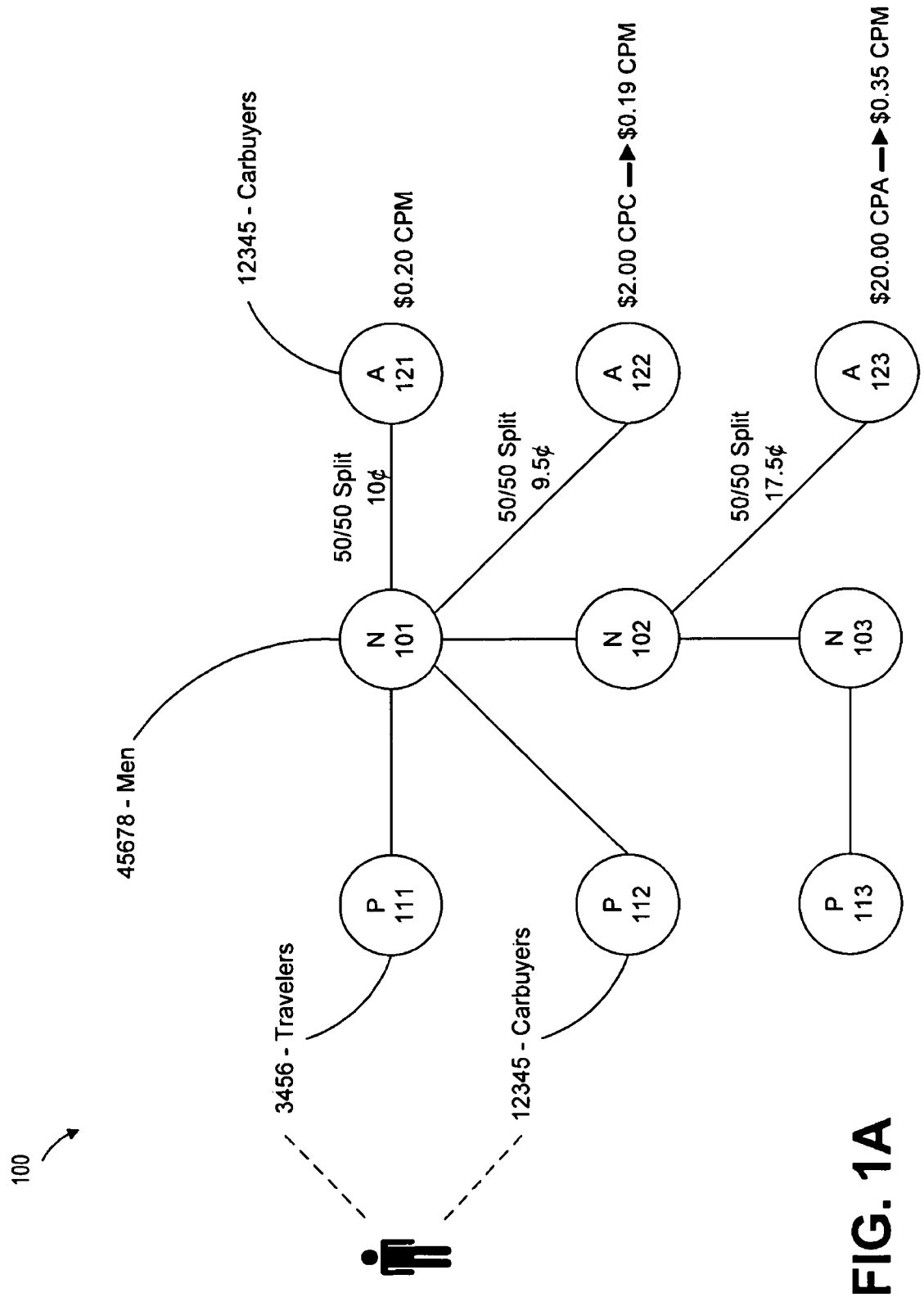
FIG. 1A illustrates exchange entities, which include several exemplary entities that participate in an ad exchange, in accordance with an embodiment of the present invention.

FIG. 1A illustrates exchange entities 100, which include several exemplary entities that participate in an ad exchange, in accordance with an embodiment of the present invention. As shown in FIG. 1A, the entities include ad networks 101, 102,103, publishers 111, 112, 113, and advertisers 121, 122, 123. Examples of ad networks include Yahoo!® Ad Network and MediaNews Group®. One of ordinary skill recognizes that the foregoing entities are exemplary and that the exchange entities 100 may contain other ad networks, publishers, advertisers, and/or other entities.

The publishers 111, 112, 113 preferably have content that is of interest to consumers (i.e., users) of such content. For instance, the publisher 112 may have a web page such as Edmunds.com that is directed to car buyers. Consumers of the Internet may visit the web page to obtain the content provided. Some embodiments log the visits and/or activities of the consumers on the web page, and further generate segments of consumers who interact with the content. As shown in the FIG. 1A, the publisher 111 may have content for travelers, while the publisher 112 has content for car buyers. Each segment preferably has a unique identifier that is unique to the segment, and is also unique to the entity. In this example, the segment "Car Buyers" for the publisher 112 is assigned the identifier "12345," the segment "Travelers" for the publisher 111 is assigned the identifier "3456," and the segment "Men" is assigned the identifier "45678" for the ad network 101.

As consumers and/or segments of consumers interact with the content provided by the publishers 111, 112, 113, "ad calls" are generated for the publishers' advertising inventory. Generally, in non-guaranteed delivery, the advertisers 121, 122, 123, bid to supply advertising to the available inventory. In this example, the advertiser 121 bids $0.20 CPM, the advertiser 122 bids $2.00 CPC, and the advertiser 123 bids $20.00 CPA. Some systems normalize the bids and/or costs to eCPM. Hence, the $2.00 CPC may be normalized to $0.19 CPM, and the $20.00 CPA to $0.35 CPM. Further, the advertisers 121, 122, 123 may have split fee arrangements with the ad networks 101, 102, 103. FIG. 1A illustrates 50/50 split fee arrangements between each advertiser 121, 122, 123, and each ad network 101, 102, 103. More specifically, for the $0.20 CPM the advertiser 121 pays for presentation of its advertising to consumers, the advertiser pays $0.10 CPM to the ad network 101. Other fee arrangements, however, are recognized by one of ordinary skill.

The advertisers 121, 122, 123 typically have advertising campaigns that include one or more ad creatives that promote a particular brand or product. The advertisers 121, 122, 123 may wish to specify certain criteria for each campaign such as, for example, maximum spend per day on the delivery of advertising, and/or criteria for targeted advertising. Examples of "hard targeting" include directing an advertisement to a particular gender and/or during a particular time of day. The advertisers 121, 122, 123 may further target particular consumers and/or segments of consumers. Particular transactions and/or data have additional value for the exchange entities 100. For instance, one or more ads and/or campaigns for the advertiser 121 may have particular relevance to the Car buyers 12345.

In one implementation, an ad manager server maintains a history of attributes for several advertisements, and predicts the value per advertisement in relation to each publisher. The ad server may perform the foregoing alternatively, or in conjunction with, behavioral type targeting based on consumer data. In some of these embodiments, each consumer has a cookie space that is used by various entities to store information. For instance, one or more entities of the exchange entities 100 advantageously write into a consumer's cookie space an integer identifier that corresponds to a particular consumer segment.

Figure 1B:
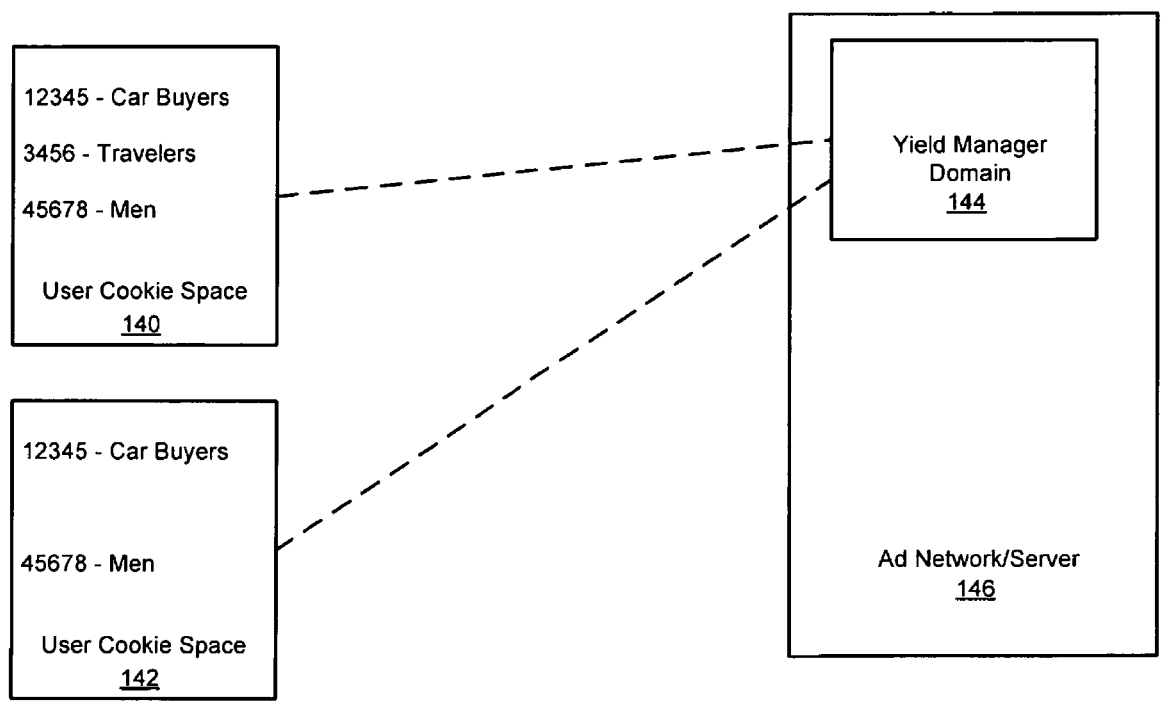
FIG. 1B illustrates a consumer cookie space that has some stored segment identifiers, in accordance with an embodiment of the present invention.

FIG. 1B illustrates a consumer cookie space 142 that has some stored segment identifiers, in accordance with an embodiment of the present invention. Examples of stored segment identifiers include 12345-CarBuyers, 3456-Travelers, and 45678-Men, that are advantageously used to target and/or generate the consumers/segment(s).

Overview of Architecture

Figure 2:
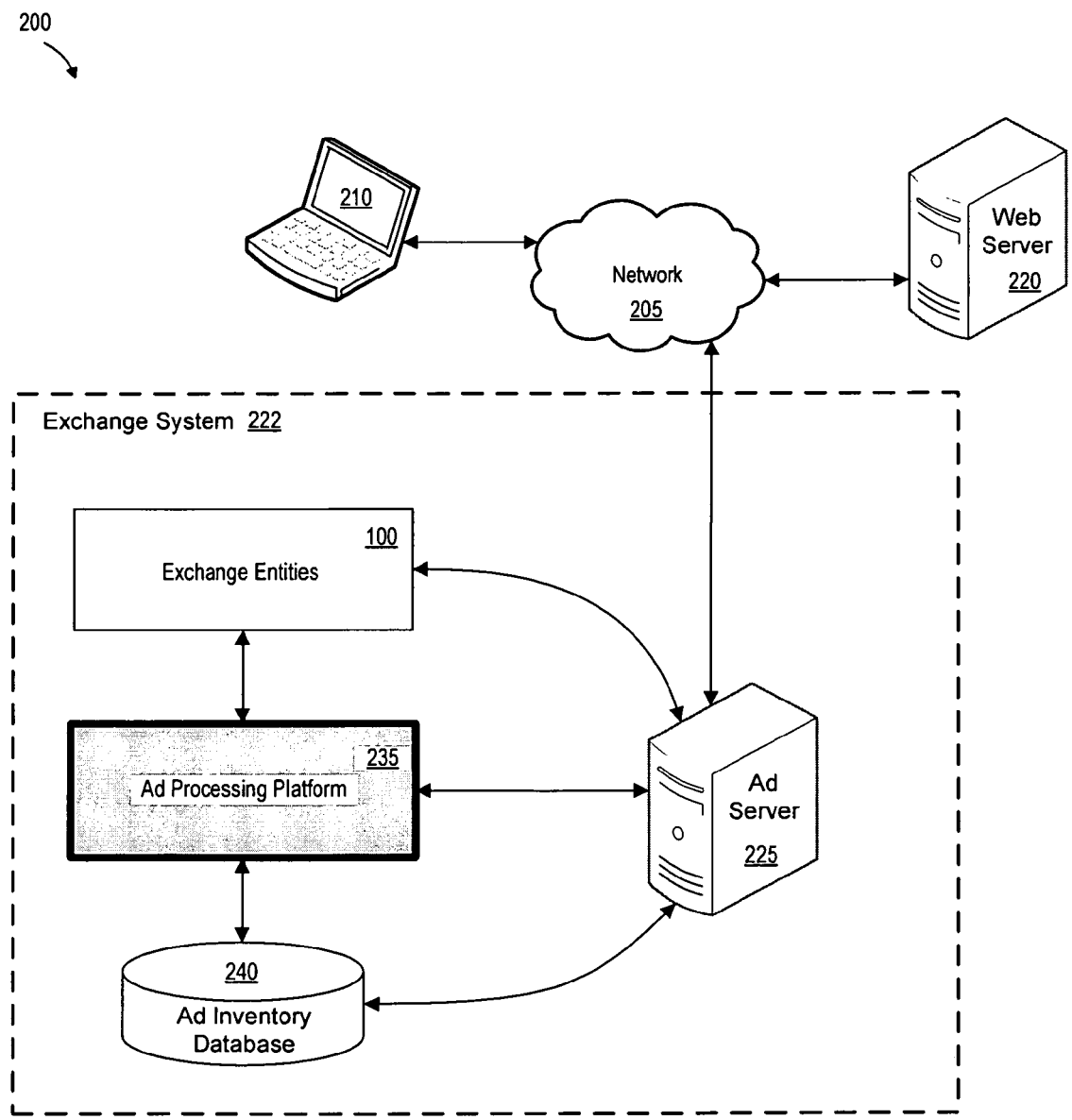
FIG. 2 is a block diagram of a system for administering a bidding language for online advertising, in accordance with an embodiment of the present invention.

FIG. 2 is a block diagram of a system 200 for administering a bidding language for online advertising, in accordance with an embodiment of the present invention. A device of the present invention is hardware, software or a combination thereof. A device may sometimes be referred to as an apparatus. Each device is configured to carry out one or more steps of the method of guaranteed delivery of ads on an exchange. Note that the bidding language and ad processing platform 235 (i.e., the associated auction system) are preferably used by a single ad network of the exchange entities 100, not a combination of networks of the exchange entities. The bidding language is intended to match supply with demand on one given network (e.g., network 101 of FIG. 1A), and also to price the supply of impressions on that given network. In an alternative embodiment, each network in FIG. 1A may independently run a version of the bidding language and the ad processing platform 235, and the bid tree specifications of the advertisers would then be portable across the different networks.

The network 205 couples together a consumer computer 210, a web server 220 and an exchange system 222. The network 205 may be any combination of networks, including without limitation the Internet, a local area network, a wide area network, a wireless network and a cellular network. The consumer computer 210 is configured to be operated by a consumer. The exchange system 222 includes without limitation an ad server 225 (or ad server system), the exchange entities 100 of FIG. 1A, an ad processing platform 235 and ad inventory database 240. The ad server 225 is coupled to the exchange entities 100, the ad processing platform 235 and the ad inventory database 240. The ad processing platform 235 is coupled to the exchange entities 100 and the ad inventory database 240. The ad processing platform 235 carries out the more important operations of the system 200.

Figure 3:
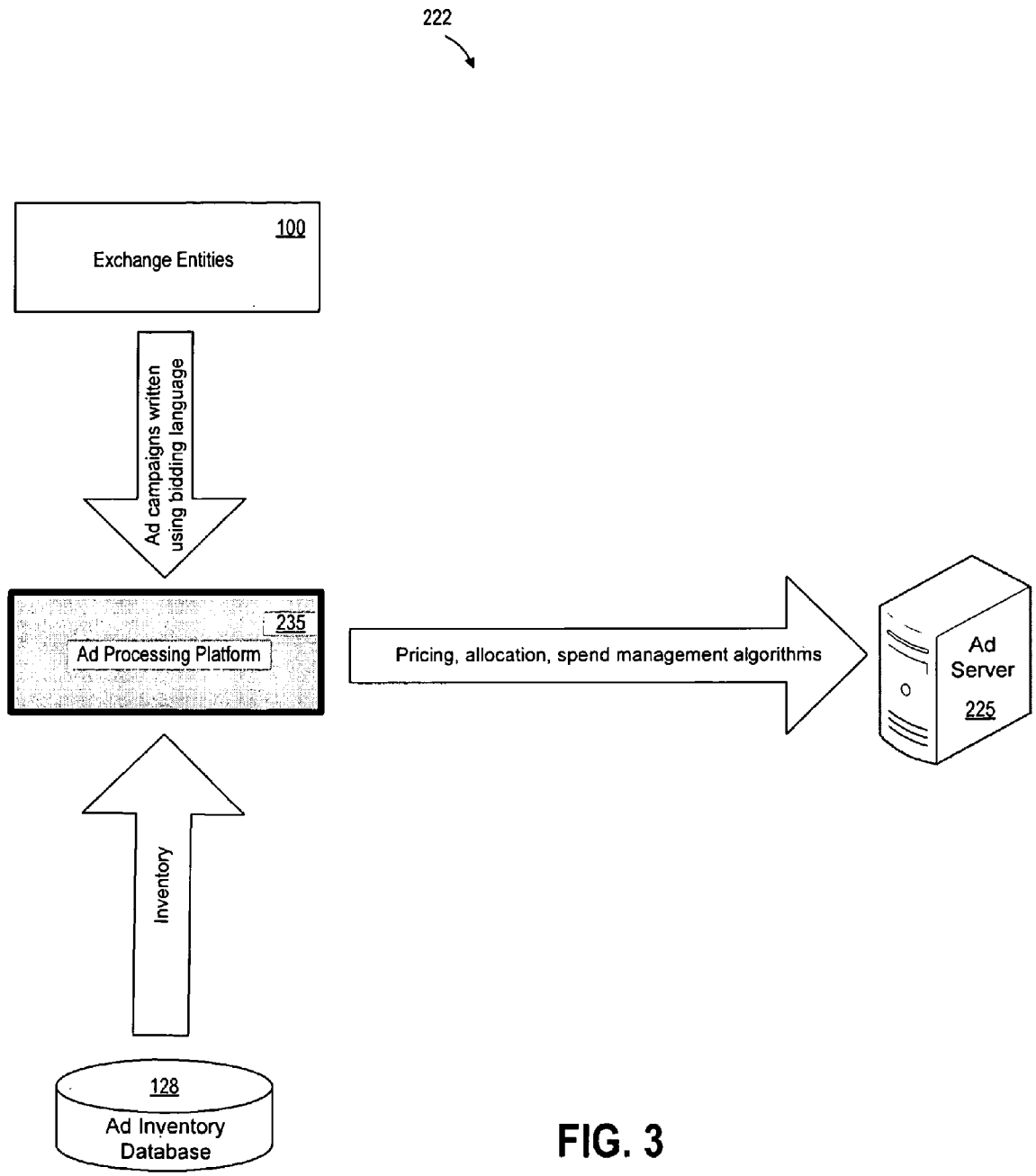
FIG. 3 is a schematic diagram of the exchange system of FIG. 2, in accordance with an embodiment of the present invention.

FIG. 3 is a schematic diagram of the exchange system 222 of FIG. 2, in accordance with an embodiment of the present invention. The exchange entities 100 include at least one advertiser that wants to advertise with a publisher. An ad network (e.g., Yahoo!® Ad Network) in the exchange entities 100 is authorized to deal and establish contracts on behalf of the advertiser. Another ad network (e.g., MediaNews Group®) is authorized to deal and establish contracts on behalf of the publisher. As discussed above with reference to FIG. 1A, there may be any number of entities between the outer entities, the advertiser 121 and the publisher 113.

The system 200 provides to advertisers a concise and expressive bidding language to specify ad campaigns which can be interpreted automatically using pricing and ad allocation algorithms. The ad processing platform 235 consumes ad campaigns (e.g., for sponsored search, contextual advertising, display advertising) specified in the expressive bidding language. The system 200 provides a modular architecture which allows an advertiser to modify a campaign and see its instant effect on ad pricing and ad allocation. The architecture provides functionality to plug and play with different bids (expressed as bid trees in the language) to observe the potential effect on ad pricing and allocation.

The advertiser writes their ad campaign into contract using the bidding language of the system 200. The bidding language syntax may be XML (extensible markup language) or another suitable syntax. The ad processing platform 235 receives the ad campaign. The ad processing platform 235 translates (i.e., compiles) the ad campaign into scripts (i.e., common data structures). The ad processing platform 235 uses the scripts to access the inventory from the ad inventory database 240, to update budgets and to update statistics of impressions (i.e., views of an advertisement), among other things.

An impression occurs when a consumer observes an ad at a consumer computer 210. The impression is distinguished by the conditions in which a consumer observed the ad. Example conditions are "the consumer is in California", "the webpage has political content", "the time of day is 'evening'", and so on. Formally, there is a set of attributes $A=\{A_1, \ldots, A_S\}$, and each attribute is a set of values; for example, the "state" attribute would be $\{CA, MA, NY, \ldots\}$. Distinct attributes are disjoint. Certain attributes could be hard to measure for a given impression; for example, the system may not be able to identify the geographic location of a consumer. Each attribute can have its own "undefined" value to handle such cases. The attributes and their possible values are determined by the seller (the network).

The ad processing platform 235 also uses the scripts to set ad pricing, to allocate ads and to carry out spend management algorithms, among other things. The ad processing platform 235 sends the information obtained from processing an ad campaign to the ad server 225. The ad server 225 then sends ads to the consumer computers according to the processed information.

The system 200 allows advertisers to do the following: specify the type of campaign they want to instigate; specify their willingness to pay for individual contextual events; specify volume constraints over bundles of contextual events; specify budget constraints for their campaigns; specify contingency upon which payment will be made. The bidding language is extensible with respect to new targeting dimensions and to new bidding mechanisms. The bidding language allows ad processing platform 235 to check for unrecognized or forbidden targeting dimensions, forbidden bids, and forbidden volume constraints. The bidding language allows the ad processing platform 235 to perform efficient ad allocation and pricing algorithms. The bidding language allows publishers to state formally the semantics used to interpret instances of the bidding language.

The bidding language provides a flexible syntax which allows optional elements that are needed for dimensions and bids. The tree structure of the bidding language facilitates nesting contextual events (i.e., signals) and helps to target more specific population segments. XML is a preferred syntax because the wide availability of XML tools (e.g., parsers and query engines) facilitates data processing. However, other syntaxes are conceivable.

Ad Processing Platform

The ad processing platform 235 is configured to administer the bidding language. The bidding language allows advertisers to specify succinctly their values and their exposure for a wide variety of different segments for the purpose of matching and clearing within a online ad auction. The bidding language admits fast, scalable algorithms for matching and pricing.

The ad processing platform 235 executes an expressive auction in which advertisers specify the kinds of demographics and websites they wish to target within an advertising network. The design allows the network to differentiate impressions according to relevant attributes (e.g., geographic location of the consumer, topic of the webpage). Advertisers can place bids for different kinds of impressions according to their attributes, and can also specify volume constraints to control exposure. The novelty of the design is a bidding language that admits scalable ad allocation and ad pricing algorithms. Described here are incentive properties of different pricing approaches, as well as a bidder feedback mechanism to mitigate the complexity of expressive bidding.

Advertisers specify values and volume constraints (i.e., bounds on the level of exposure) in a tree format. Each node in the tree corresponds to a consumer segment. Moving down the tree, the system recognizes nodes that represent narrower consumer segments. At each node, the advertiser specifies a value and a volume constraint. The tree structure is not fixed in advance. Advertisers start with a root node and may branch repeatedly on leaf nodes to define narrower user segments. The root node represents all possible consumers. Each leaf node represents a particular combination of consumer and page attributes (e.g., location, age, topic).

The design of expressive auctions is an interdisciplinary endeavor that draws on ideas from microeconomics and computer science, in particular AI (artificial intelligence). AI techniques have found application in two key design areas:

Bidding languages. Bidders cannot exhaustively describe their values for every possible outcome. A language (syntax and semantics) is needed that can succinctly describe realistic valuation functions. The language is usually specified in terms of data structures that allow value information to be efficiently queried.

Ad allocation algorithms. Given representations of the bidders' preferences, an efficient (value-maximizing) ad allocation must be computed, and in practical settings such as combinatorial auctions this can be NP-hard (nondeterministic polynomial-time hard). Effective algorithms and heuristics are needed that perform well on realistic problem instances.

The ad processing platform 235 provides an expressive auction design for online advertising. The auction allocates a forecasted supply of different kinds of impressions; impressions are differentiated according to the conditions under which they occur (e.g., topic of the webpage or geographic location of consumer). The supply is forecast over a fixed time period such as a week. If market conditions do not change, the computed ad allocation can be interpreted as the expected amount of impressions that each bidder will receive in the period. At any given time, however, it is best to interpret the ad allocation as the rate at which bidders will receive different kinds of impressions. Preferably, the ad allocation should be recomputed at fixed time intervals (e.g., daily), and also if there are significant changes in market conditions, such as entry or exit of large bidders.

The auction is meant to be complemented with a scheduling algorithm. The scheduler device (not shown) that runs the scheduling algorithm is configured to deliver ads over time in such a way that the realized ad allocation rate matches the desired rate computed by the auction. This scheduling problem is an orthogonal issue that is not addressed here. In one embodiment, the scheduler device resides in the ad server 225. In another embodiment, the scheduler device resides somewhere between the ad processing platform 235 and the ad server 225. In still another embodiment, the scheduler device resides across a combination of computing apparatuses, including without limitation the ad server 225 and the ad processing platform 235.

The core of the design is a bidding language that allows bidders to specify values for different kinds of impressions, and also to place volume constraints on impressions to control exposure. Besides expressiveness, the language is designed with incentives and computational tractability in mind. It allows for, among other things, (1) efficient and scalable ad allocation algorithms, so that ad allocations can be quickly recomputed when needed, (2) unique market-clearing prices that minimize the bidders' incentives to game the auction, and (3) efficient, combinatorial algorithms for computing these specific market-clearing prices.

The ad processing platform 235 includes a bidder feedback mechanism that can recommend bid increases to agents who would like to achieve greater volume of certain demographics.

The ad processing platform 235 computes an "efficient" (value-maximizing) rather than "optimal" (revenue-maximizing) ad allocation. Efficient can mean value-maximizing, when referring to ad allocations, or polynomial-time, when referring to algorithms. It should be clear from context which definition applies. The focus here is on efficiency because there are currently several competing ad networks, so it is unclear whether it is feasible to exercise monopoly power in this landscape. Still, it may be possible to modify the design to extract more revenue; this would involve weighting bidders so that their bids are not all considered equally. Note that this kind of approach is known in the technical art, and its application to the online advertising domain is still an open and challenging problem.

Design Parameters Overview

Before a formal description of the bidding language, discussed here are the design parameters.

Expressiveness

Advertisers may specify the type of campaign they want to instigate. Advertisers may express online advertising, sponsored search or contextual advertising in the same language.

Advertisers may specify their willingness to pay for individual contextual events. The bidding language allows advertisers to rank all possible contextual events according to their value (willingness to pay) for each event. It is also possible, even common, for advertisers to be indifferent between distinct events, in which case their values are the same. For instance, it should be clear from a bid file which of "males age 25-34 in CA" and "females age 45-54 in FL" is valued highest.

Advertisers may specify volume constraints over bundles of contextual events. It is desirable to allow advertisers to specify upper bounds on the volume of certain contextual events, so that they can better control the exposure of their campaigns. For instance, an advertiser may run a nationwide campaign but place an upper bound on exposure to states of the Southwest if the main focus is the rest of the country.

Advertisers may specify budget constraints for their campaigns. It is desirable and common to let advertisers place limits on the total amount they want to spend in any advertising campaign.

Advertisers may specify contingency upon which payment will be made. In online advertising, pricing schemes vary according to conditions that trigger a payment—an impression, a click, or an advertiser-specified "action" more generally (e.g., a product sale). Advertisers may specify different values for different conditions.

Extensibility

The bidding language is extensible with respect to new targeting dimensions (e.g., new user segments). As advertisers become more sophisticated in the online domain, their targeting needs will expand, and ad networks will improve their technologies to meet these needs. The bidding language should therefore be extensible so that new targeting dimensions are simple to introduce.

The bidding language is extensible with respect to new bidding mechanisms (e.g., ways of structuring the present bidding tree structure into a new bidding mechanism). As advertisers become more sophisticated in the online domain, their bidding mechanisms will become more powerful. The present bidding language does not disable such extensions to previously defined campaigns.

Efficiency

The bidding language allows for static checking of unrecognized or forbidden targeting dimensions, forbidden bids, and forbidden volume constraints. Advertisers may specify targeting along dimensions that certain publishers normally do not track or cannot measure. It is useful then to be able to quickly detect such dimensions. Advertisers are also not allowed to place negative bids for events, or to state volume constraints that make the set of acceptable bundles empty. There are efficient means of checking that such restrictions are met.

The bidding language allows for efficient allocation and pricing algorithms. While natural expressiveness is important, the language is also designed such that efficient algorithms exist to find optimal ad allocations, according to a meaningful economic objective such as aggregate advertiser welfare, and also to price events.

Interpretation

Publishers may formally state the semantics used to interpret instances of the language. While a language can communicate values for individual events, it may be counterproductive to specify exactly how those values should be extrapolated to bundles of events. Ad networks may choose to interpret individual events as complements or substitutes, and this flexibility translates to broader options for ad allocation and ad pricing.

Bidding Language

Described here are the bidding language in terms of the data structures that would be used to encode its instances, and then the properties of the valuations the bidding language describes. A specific bidding interface is not described. Many different conceivable interfaces are suitable for the bidding language and are within the scope of the system.

Bid Trees

To encode valuations, the system utilizes "bid trees" that enable advertisers to specify values for various kinds of impressions. Bid trees can be used to encode both the advertisers' true valuations and their reported valuations, or "bids". The two need not coincide, as is explain later when addressing incentives. However, for clarity, it is assumed for now that the advertisers' true valuations and their reported valuations do coincide.

Figure 4B:
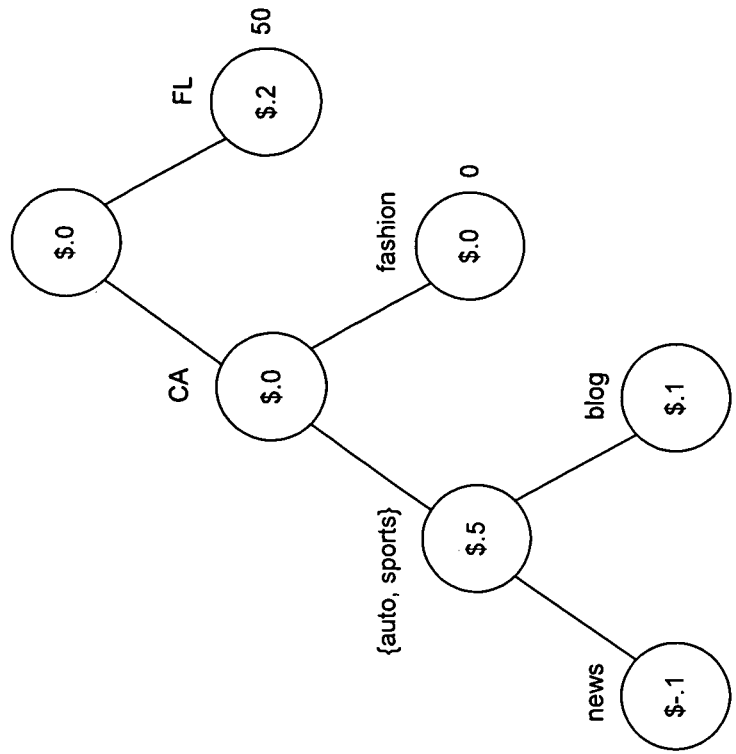
FIG. 4B shows the example bid tree of FIG. 4A with an added new node and volume constraints, in accordance with an embodiment of the present invention.
Figure 4A:
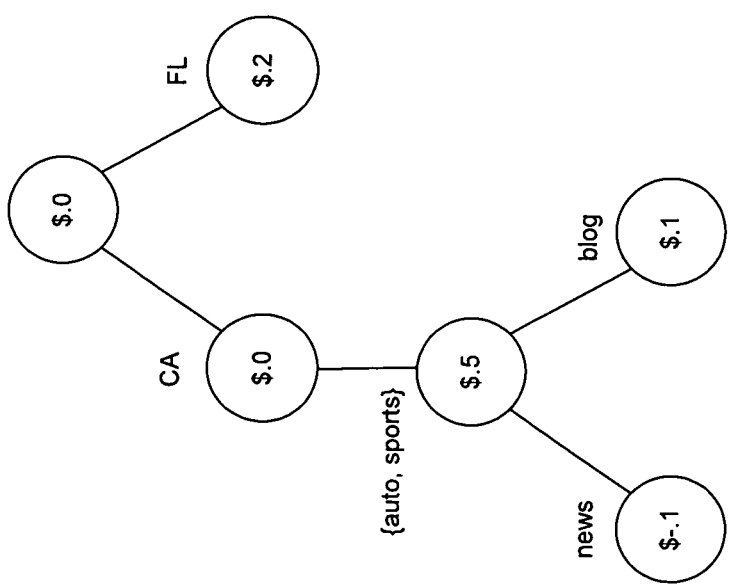
FIG. 4A shows an example bid tree for valuation of bids from an advertiser, in accordance with an embodiment of the present invention.

FIG. 4A shows an example bid tree for valuation of bids from an advertiser, in accordance with an embodiment of the present invention. Suppose a car manufacturer wishes to run an online campaign to advertise a new truck model. The campaign should only run in California and Florida. In Florida, the campaign should have a limited exploratory run across a variety of sites to see what demographics respond best to the new model. In California, the campaign should project a "rugged" image for the truck. The company therefore decides to run its banner ad next to content with an "automotive" or "sports" theme, and to avoid any content with a "fashion" theme. It also decides to value exposure on blogs and devalue mainstream news sites because it would like the campaign to have "grassroots" appeal.

The root node at the top represents all possible impressions over the network. The value of an impression from a certain source is evaluated by traversing down branches of the tree following relevant attributes (represented by the nodes), starting at the root, and summing the values in the nodes along the way. The sum represents the overall valuation of the attributes in the traversal. For instance, impressions on automotive or sports sites in CA are valued at $0.4 if they are news sites, $0.6 if they are blogs, and $0.5 otherwise.

An advertiser constructs its bid tree by starting with a root node, and then creating more nodes by repeatedly branching on an attribute at a leaf (i.e., node that has no children). An advertiser may branch on only some values of an attribute $A_t$ rather than all values for $A_t$ if the advertiser chooses. The advertiser may also branch on sets of attributes, as long as the sets are disjoint. For instance, separate branches for {CA, FL} and {FL, NY} are not allowed, as this separation leads to ambiguous semantics. An attribute may not be branched on at a node if it was already branched on at an ancestor node (i.e., a node above).

But there may still be a disconnection between the bid tree in FIG. 4A and the company's valuation. Exposure outside of CA or FL is worthless, but does not do any harm if it occurs, so it indeed has value $0. On the other hand, exposure on fashion sites in CA does do harm, because such exposure goes against the brand image the advertiser is trying to project in that state. Also, there is no telling how many impressions will come from FL, even though the run there should be limited. Hence, the system further allows advertisers to annotate nodes with capacities.

FIG. 4B shows the example bid tree of FIG. 4A with an added new node and volume constraints, in accordance with an embodiment of the present invention. The new node is for fashion sites in CA, with a capacity of 0 to ensure no impressions are provided. The FL node now has a capacity of 50,000 impressions to ensure the campaign there is limited to this exposure.

Properties

The value functions encoded by bid trees can be described formally as follows. Given bidder i's bid tree, the system defines a family $T_i$ of subsets of M corresponding to each node. For instance, for the bid trees of FIGS. 1A-1B, the system would have the set of all impressions that occurred in CA, the set of all impressions on automotive or sports sites in CA, the set of all impressions on automotive or sports blogs in CA, etc. It is straightforward to see that, because of the tree format, this family is laminar: for any T,T'∈$T_i$, either T⊂T', T' ⊂ T, or T∩T'=0. To each T∈$T_i$ is associated an integral capacity $c_{iT}$ (possibly +∞) and a value $b_{iT}$. Define the functions $$v_{iT}(r) = \begin{cases} b_{iT}r & \text{if } 0 \le r \le c_{iT} \\ -\infty & \text{otherwise.} \end{cases} \quad \text{Equation 1}$$

for each T∈$T_i$. Here r is a non-negative scalar, representing a certain number of impressions.

The agent's value for a bundle of impressions $x_i$ is then $$v_i(x_i) = \sum_{T \in T_i} v_{iT}(x_i(T)). \quad \text{Equation 2}$$

where $x_i(T)$ is shorthand for $\Sigma_{j \in T} x_i(j)$, namely the total of all impressions from T. The volume constraints make the valuation functions nonlinear.

It is known that valuations of the form of Equation 2, where $T_i$ is laminar and each $v_i(T)$ exhibits decreasing marginal values over some interval (and is $-\infty$ outside this interval), are "M-concave." The actual specification of this condition is not important for the treatment here. Intuitively, it implies that impressions are "substitutes": if the price of an impression j∈M is increased, an agent's demand for the other impressions does not decrease, because the agent substitutes away from j.

This M-concave property is a main motivation for adopting bid trees, besides their natural expressiveness. It is well-known that the M-concave property implies the existence of market-clearing prices, and the M-concave property also allows for fast ad allocation and pricing algorithms.

Ad Allocation

A natural way to allocate impressions in an online fashion is to give each arriving impression to the advertiser who values it most among those advertisers for whom the extra impression would not violate any volume constraints. This scheme does not maximize advertiser welfare in the present context. Volume constraints are the source of the complication, as the following example illustrates. Schemes often fail because they because they do no take into account forecasted supply. Recall that the auction here computes a desired ad allocation over a fixed time period (equivalently, desired ad allocation rates), and passes the result to a scheduler. The efficient ad allocation problem can be formulated as a linear program, such as the following:

$$\max_x \sum_{i \in N} \sum_{T \in T_i} \sum_{j \in T} b_{iT} x_i(j), \text{ such that } \ldots \quad \text{Equation 3}$$

$$\sum_{j \in T} x_i(j) \le c_{iT}, \text{ where } (T \in T_i, i \in N).$$

$$\sum_{i \in N} x_i(j) \le z(j), \text{ where } (j \in M) \quad \text{Equation 4}$$

$$x_i(j) \ge 0, \text{ where } (i \in N, j \in M).$$

Equation 3 enforces the bidders' capacity constraints and Equation 4 ensures that the number of impressions does not exceed the supply. Because the agents' valuations are M-concave, this linear program in fact has an integer optimal solution. This fact makes the auction design suitable for situations where there are a small, fixed number of impressions available (e.g., in a television station's daily programming schedule).

Ad Pricing

The linear programming approach to the ad allocation problem is useful because it also provides prices for various kinds of impressions.

To save on bandwidth and lessen the burden on the auction infrastructure, changes in the agents' bid trees preferably reflect actual changes in their valuations, rather than gaming behavior. Market-clearing prices are useful because they ensure a certain amount of stability in the bids. If agents act purely as price takers, they are satisfied with the given ad allocation, and no changes in their trees are needed. The auctioneer is also satisfied because no impression that could have generated more revenue goes unallocated.

Of course, agents may realize that they are not in fact price-takers, and that the prices should vary as the bid trees are changed, either in structure or value. It is therefore instructive to consider what incentives the agents may have to alter their bid trees. Preferably, the system reaches a scenario where the agents are satisfied with their current bid trees as far as the ad allocation and ad prices that result. The next section addresses this design issue.

Incentives

If no agent would gain by adapting its bid tree, no matter how the other agents behave, this is known as a "dominant strategy equilibrium" in pure strategies. A classic way to achieve this in multi-agent systems is through VCG (Vickrey-Clark-Groves) payments. VCG payments are where each advertiser pays the externality the advertiser imposes on others. Unfortunately, it may not be possible to charge VCG payments in a competitive equilibrium in the model here because the price space is not rich enough; the system only considers linear prices. It is well-known that nonlinear and personalized prices may be needed to price the VCG payoff point when agents have M-concave valuations. This kind of pricing does not seem appropriate for this domain, because bidders can enter or leave the system at any time in a typical online ad auction. So, it is necessary to provide informative prices to new arrivals. Personalized prices provide no useful information to new entrants. It is well-known that linear prices may be highly informative: linear prices are easy to interpret, and apply to everyone simultaneously.

An alternative then is to quote the linear prices that minimize the incentives for bidders to adapt their bid trees. This may be a good compromise if bidders are bounded-rational and would not notice or bother to switch when this would yield just a small improvement in payoff. In this case, it well-known that minimal market-clearing prices maximize the incentives for truthful reporting. Therefore, implementing the smallest linear CE price vector p leads to the most "stable" system in a sense, if the system is restricted to linear prices. The bidding language here guarantees that a unique smallest price vector exists.

Bidder Feedback

The discussion on incentives in the previous section assumed (as is standard in game theory) that bidders are perfectly rational and know their valuation functions exactly. In practice, bidders vary in their level of sophistication. Some bidders may not have exact value information, or may find it costly to place a precise value on different impressions. It may be the case that such advertisers only indirectly know their valuations through demand information: given current prices, they know how much volume they would like of different kinds of impressions, but have not converted their demand function into a valuation function. Thus, a simple bidder feedback mechanism is described here that can suggest bid tree updates to bidders who want to increase their volume for different kinds of impressions.

Suppose bidder i wants to receive at least $d_{iT}$ impressions from sites in $T \subset M$, where $T \in T_i$ is a node in bidder i's bid tree. For example, the advertiser with the bid tree in FIG. 4B may only receive 10,000 impressions from FL, and want to increase FL impressions to 20,000. Naturally, the advertiser should first ensure that the volume constraint for the node is $c_{iT} \geq d_{iT}$. If this change still does not give the desired volume, the bid $b_{iT}$ should be increased.

Consider the introduction of the constraint $$\sum_{j \in T} x_i(j) \geq d_{iT}$$

into the allocation linear program to find an efficient allocation. Let $\lambda$ be the optimal value of the dual variable corresponding to this constraint. Suppose bidder i increases $b_{iT}+\lambda$ in its bid tree, and leaves the bids in the other nodes unchanged. Then there exists an efficient allocation, with respect to the new profile of bid trees, in which i receives at least $d_{iT}$ units of impressions from $T \subset M$. Accordingly, just as bids can be specified at various levels of granularity, local updates to the bid tree can affect volumes at different levels of granularity. For instance, if a bidder wishes to increase overall impressions regardless of origin, the feedback scheme would suggest an appropriate increase at the root node.

Method Outline

Figure 5:
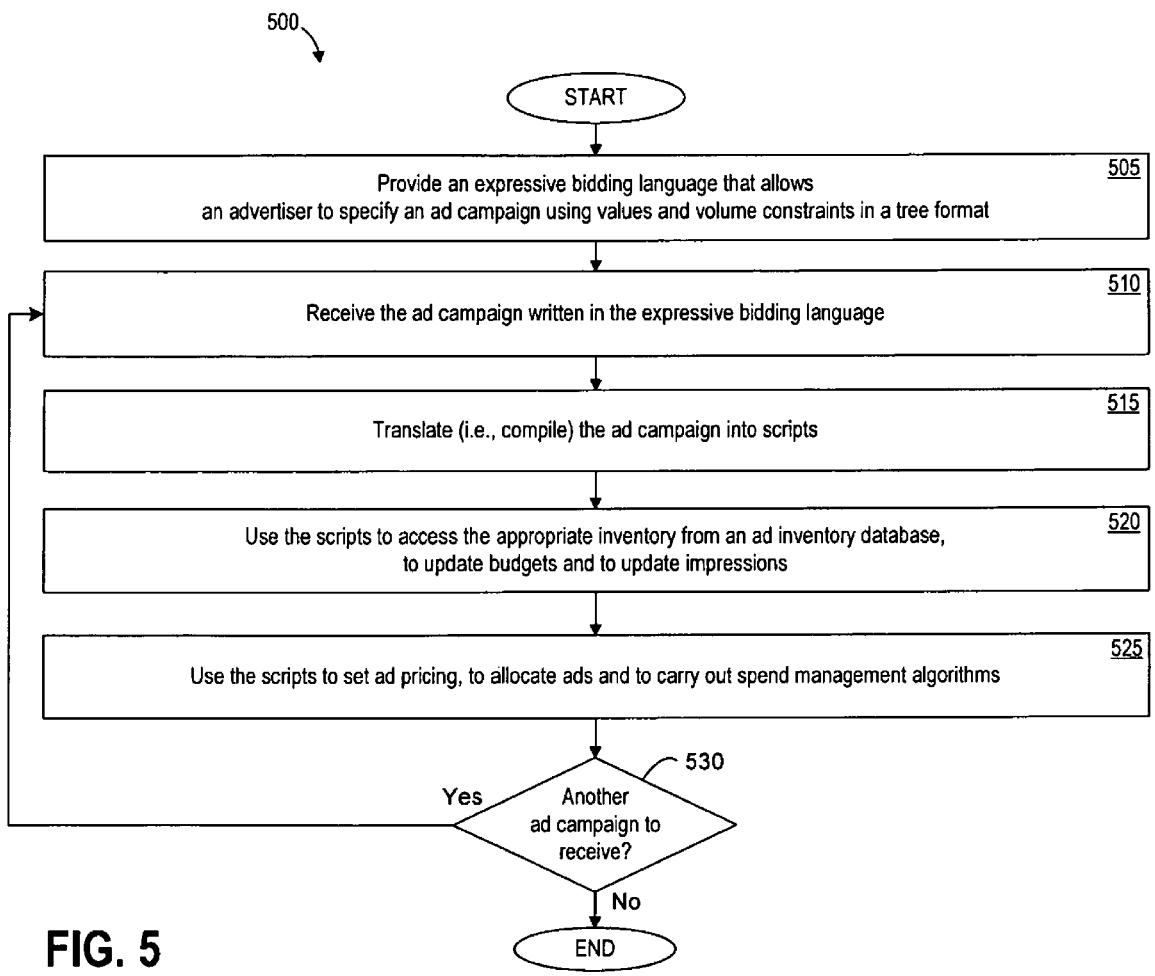
FIG. 5 is a flowchart of a method for administering a bidding language for online advertising, in accordance with an embodiment of the present invention.

FIG. 5 is a flowchart of a method 500 for administering a bidding language for online advertising, in accordance with an embodiment of the present invention. The method 500 may be carried out by the ad processing platform 235 of FIG. 2. The method 500 starts in step 505 where the system provides an expressive bidding language to an advertiser or to an entity authorized to make decisions on behalf of the advertiser. The expressive bidding language allows the advertiser to specify an ad campaign using values and volume constraints in a tree format. The method 500 then moves to step 510 where the system receives the ad campaign that is written in the expressive bidding language. Next, in step 515, the system translates (i.e., compiles) the ad campaign into scripts. Moving to step 520, the system uses the scripts to access the appropriate inventory from an ad inventory database, to upgrade budgets and to update impressions, among other things. The method then proceeds to step 525 where the system uses scripts to set ad pricing, to allocate ads and to carry out spend management algorithms, among other things. An additional step may include sending to an ad server the information obtained from processing the ad campaign. Next, in decision operation 530, the system determines if there is any other ad campaigns from any advertiser or from an entity authorized to make decisions on behalf of an advertiser. If the there are other ad campaigns to receive, the system returns to step 510 and continues. However, if there are no other ad campaigns to receive, the method 500 is at an end.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human consumer or other mechanism utilizing the results of the present invention. Such software may include without limitation device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation providing an expressive bidding language that allows an advertiser to specify an ad campaign in a tree structure, receiving the ad campaign that is written in the expressive bidding language, translating the ad campaign into scripts, and using the scripts to access appropriate inventory from an ad inventory database, according to processes of the present invention.

Advantages

The system provides an expressive auction design for the domain of online advertising, for use within advertising networks. At the core of the design is a bidding language that allows advertisers to specify values for different kinds of impressions, and that admits scalable ad allocation and pricing algorithms. The language does not force the advertisers to refine their values according to irrelevant attributes, but rather allows them to specify bids at different levels of granularity. Volume constraints give the advertisers even more control over their campaigns. There is also the possibility of providing feedback (again, at different levels of granularity), to help the advertisers assess the cost of volume increases at different nodes.

The system is configured for consuming ad campaigns (e.g., sponsored search, contextual advertising, display advertising) that are specified in a single expressive bidding language.

The system provides a modular architecture, which allows an advertiser to modify a campaign and see its instant effect on ad pricing and ad allocation, to plug and play with different ad pricing and ad allocation strategies, and to plug different ad inventories.

The bidding language offers an intuitive way for advertisers to encode their targeting preferences. The bidding language accommodates advertisers that have broad or narrow targeting requirements by allowing succinct descriptions of their preferences in each case.

The structure of the bidding language admits fast (polynomial-time) algorithms for matching advertisers to impressions, and for pricing impressions using simple linear prices: there is one price for each different impression. This makes it suitable for large-scale ad auctions (e.g., to match advertisers to impressions in the Yahoo!® Publisher Network).

The bidding language allows impressions to be matched as indivisible units (rather than fractional). The bidding language therefore also applies to small-scale ad auctions (e.g., to match advertisers to slots in a television station's daily programming schedule).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method of administering a bidding language for online advertising, the method comprising:
providing, using a computer, an expressive tree structure that allows an advertiser to specify an ad campaign in a plurality of nodes, the nodes comprising:
at least one value attribute corresponding to an advertiser-specified value associated with a grouping of consumers represented by a node,
at least one volume constraint corresponding to limit on exposure of the ad campaign to a grouping of consumers represented by a node, wherein the volume constraint is determined by the advertiser based on a desired focus of the ad campaign;
providing, using a computer, a bidder feedback mechanism for the advertiser, by
receiving, from the advertiser, at least one target impressions value from the advertiser corresponding to at least one grouping of consumers represented by at least one node,
transmitting, to the advertiser, at least one recommended efficient allocation comprising a recommended value attribute and a recommended volume constraint corresponding to at least one node, wherein the recommended efficient allocation is computed based on the target impressions value, the value attribute, the volume constraint, and an inventory forecast; and
adjusting, in a computer, the ad campaign based on the recommended efficient allocation,
receiving, at a computer, the ad campaign that is written in the expressive bidding language;
translating, using a computer, the ad campaign into scripts; and
using, in a computer, the scripts to access appropriate inventory in an ad inventory database.

2. The method of claim 1, wherein the nodes further comprise at least one of:
a root node that stands alone, wherein the root node represents all possible consumers; and
at least one branch to one or more leaf nodes, wherein each leaf node represents a grouping of consumers.

3. The method of claim 2, wherein the grouping of consumers represented by the leaf node is a sub-grouping of a grouping of consumers represented by its branch node.

4. The method of claim 2, further comprising:
starting at the root node;
if the at least one branch exists, traversing down the at least one branch to nodes that may apply to a particular ad; and
summing values in traversed nodes to obtain an overall valuation of attributes along a traversed path.

5. The method of claim 2, further comprising
receiving a new tree structure having a new node representing a change to the tree structure, wherein the new tree structure represents a new ad campaign; and
translating the new ad campaign into scripts.

6. The method of claim 1, further comprising using the scripts to carry out at least one of:
an update of an advertising budget;
an update to impressions statistics;
a setting of ad pricing;
an allocation of an ad; and
a spending management algorithm.

7. The method of claim 1, further comprising:
calculating an appropriate change at a particular node to correspond with a desired ad campaign update; and
providing the appropriate change as feedback to the advertiser.

8. The method of claim 1, wherein the expressive bidding language is extensible with respect to at least one of:
a new targeting dimension; and
a new bidding mechanism.

9. The method of claim 1, further comprising checking for unrecognized targeting dimensions, forbidden targeting dimensions, forbidden bids and forbidden volume constraints, wherein the expressive bidding language allows the advertiser to specify targeting along dimensions that certain publishers normally do not track.

10. A hardware apparatus comprising a processor and a memory configured to execute steps for administering a bidding language for online advertising, the steps comprising:
providing an expressive tree structure that allows an advertiser to specify an ad campaign in a plurality of nodes, the nodes comprising:
at least one value attribute corresponding to an advertiser-specified value associated with a grouping of consumers represented by a node,
at least one volume constraint corresponding to limit on exposure of the ad campaign to a grouping of consumers represented by a node, wherein the volume constraint is determined by the advertiser based on a desired focus of the ad campaign;
providing a bidder feedback mechanism for the advertiser, by
receiving, from the advertiser, at least one target impressions value from the advertiser corresponding to at least one grouping of consumers represented by at least one node,
transmitting, to the advertiser, at least one recommended efficient allocation comprising a recommended value attribute and a recommended volume constraint corresponding to at least one node, wherein the recommended efficient allocation is computed based on the target impressions value, the value attribute, the volume constraint, and an inventory forecast; and
adjusting the ad campaign based on the recommended efficient allocation,
receiving the ad campaign that is written in the expressive bidding language;
translating the ad campaign into scripts; and
using the scripts to access appropriate inventory in an ad inventory database.

11. The apparatus of claim 10, wherein the nodes further comprise at least one of:
a root node that stands alone, wherein the root node represents all possible consumers; and
at least one branch to one or more leaf nodes, wherein each leaf node represents a grouping of consumers.

12. The apparatus of claim 11, wherein the grouping of consumers represented by the leaf node is a sub-grouping of a grouping of consumers represented by its branch node.

13. The apparatus of claim 11, wherein the apparatus is further configured for:
starting at the root node;
if the at least one branch exists, traversing down the at least one branch to nodes that may apply to a particular ad; and
summing values in traversed nodes to obtain an overall valuation of attributes along a traversed path.

14. The apparatus of claim 11, wherein the apparatus is further configured for:
receiving a new tree structure having a new node representing a change to the tree structure, wherein the new tree structure represents a new ad campaign; and
translating the new ad campaign into scripts.

15. The apparatus of claim 10, wherein the apparatus is further configured for using the scripts to carry out at least one of:
an update of an advertising budget;
an update to impressions statistics;
a setting of ad pricing;
an allocation of an ad; and
a spending management algorithm.

16. The apparatus of claim 10, wherein the apparatus is further configured for:
calculating an appropriate change at a particular node to correspond with a desired ad campaign update; and
providing the appropriate change as feedback to the advertiser.

17. The apparatus of claim 10, wherein the expressive bidding language is extensible with respect to at least one of:
a new targeting dimension; and
a new bidding mechanism.

18. The apparatus of claim 10, wherein the apparatus is further configured for checking for unrecognized targeting dimensions, forbidden targeting dimensions, forbidden bids and forbidden volume constraints, wherein the expressive bidding language allows the advertiser to specify targeting along dimensions that certain publishers normally do not track.

* * * * *